(No Model.)
J. P. DOELFEL & J. C. G. HÜPFEL.
APPARATUS FOR MASHING.
No. 368,076. Patented Aug. 9, 1887.
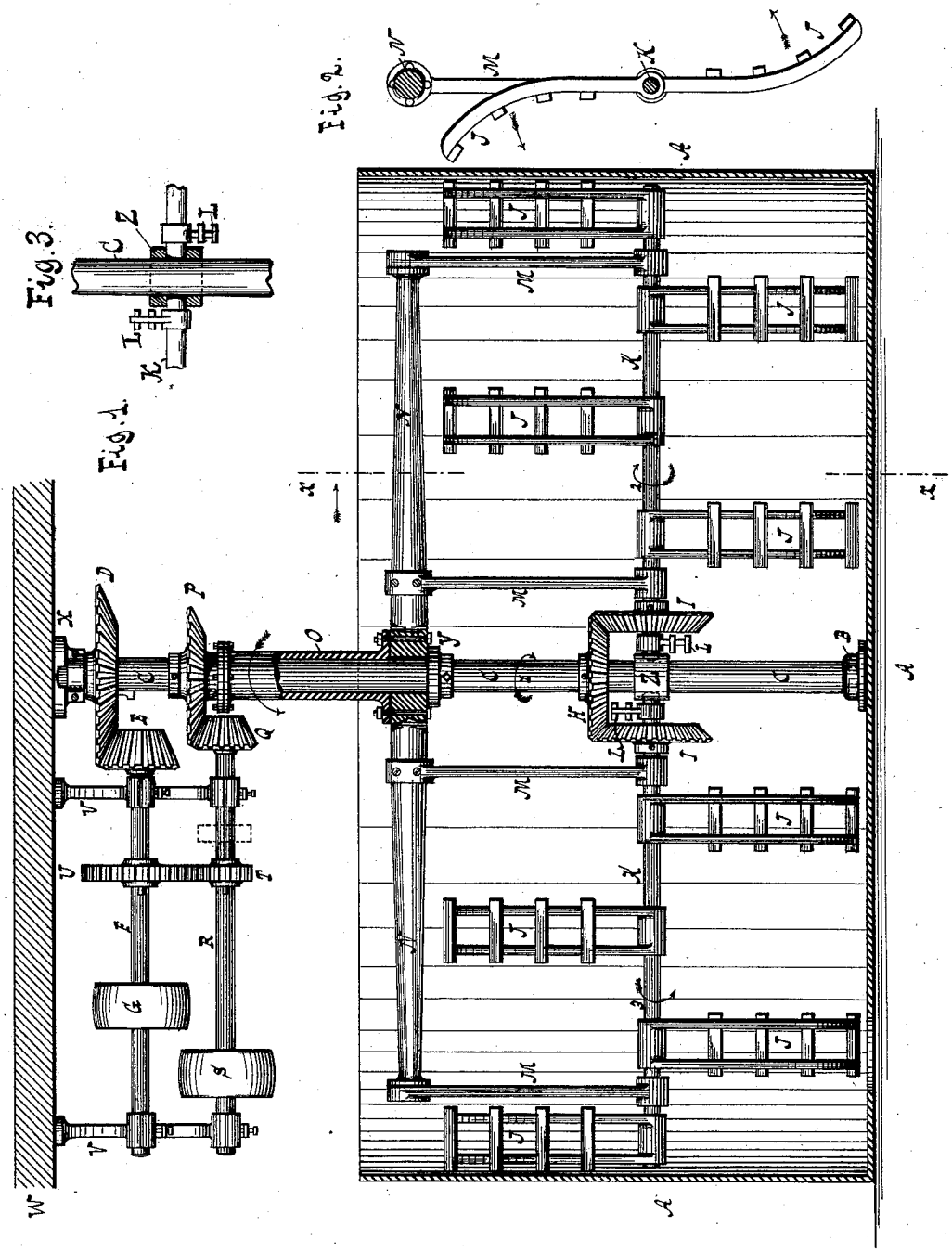
WITNESSES:
INVENTORS:
John P. Doelfel.
John C. G. Hüpfel.
BY
their ATTORNEYS

United States Patent Office.

JOHN P. DOELFEL AND JOHN C. G. HÜPFEL, OF NEW YORK, N. Y.

APPARATUS FOR MASHING.

SPECIFICATION forming part of Letters Patent No. 368,076, dated August 9, 1887.

Application filed February 10, 1887. Serial No. 227,149. (No model.)

*To all whom it may concern:*

Be it known that we, JOHN P. DOELFEL and JOHN CHRISTIAN G. HÜPFEL, both citizens of the United States, residing at New York, in the county and State of New York, have invented new and useful Improvements in Apparatus for Mashing, of which the following is a specification.

This invention relates to improvements in mashing apparatus, as set forth in the following specification and claims, and illustrated in the accompanying drawings, in which—

Figure 1 is a front elevation, partly in section, of a mashing apparatus. Fig. 2 is a section in the plane $x\,x$, Fig. 1; and Fig. 3, a detail view, partly in section, showing portions of the main shaft and stirrer-shafts.

Similar letters indicate corresponding parts.

In the drawings, the letter A indicates a mash-tub. In a bearing or support, B, turns a main shaft, C. A bevel-gear, D, keyed or secured to the main shaft, is adapted to actuate the main shaft. Suitable actuating mechanism—such as a pulley, G, driving-shaft F, and bevel-gear E—are shown as adapted to actuate the bevel-gear D. The motion of the main shaft C imparts motion to the stirrer-shafts K. Gears H and I are shown as adapted to transmit motion from the main shaft C to the stirrer-shafts. By having the driving-gear H on the main shaft C, located above the stirrer-shafts, as shown, the material at the bottom of the tub A is not liable to rise to the driving-gear H. Said gear H is thus not liable to be choked by the material which is being operated on at the bottom of the tub A.

The driving-gear H is shown as firmly connected to the main shaft C. The connecting-gears I are shown as firmly connected to the stirrer-shafts K. By rotating the main shaft C in the direction of arrow 1 the stirrer-shafts K will be caused to rotate, as indicated by arrows 2 and 3.

The stirrers J are firmly connected to the stirrer-shafts K, and move with said stirrer-shafts. Supplementary or secondary stirrers, L, between the gears I and the main shaft C tend to clear the space between the gears I and the main shaft C from material which has a tendency to lodge in such space.

The driving-gear H and connecting-gear I cause the stirrer-shafts to rotate about their own axes. The stirrer-shafts K also move about the main shaft C, as will be now described.

The stirrer-shafts K are supported or borne by hangers M. The hangers M are connected to arms or to a frame, N, loosely mounted on the main shaft. The arms or frame N are connected to a sleeve, O. The sleeve O is mounted loosely on the main shaft C, and said sleeve O is adapted to rotate independently of the main shaft C. A bevel-gear, P, connected to the sleeve O, is adapted to actuate the sleeve O. A pulley, S, shaft, R, and bevel-gear Q are shown as adapted to actuate the bevel-gear P and sleeve O. A suitable shoulder, Y, on the main shaft C is shown as adapted to support the sleeve O.

The rotation of the sleeve O carries the frame or arm N and the stirrer-shafts K about the interior of the tub A. The stirrer-shafts K are also shown as being loosely connected to the main shaft C.

The collar Z, which loosely encircles the main shaft C, supports the inner ends of the stirrer-shafts K, and said main shaft C is free to turn in the collar without the stirrer-shafts moving around in a horizontal plane in the mash-tub.

By having the sleeve O adapted to move independently of the main shaft C different speeds can be imparted to the sleeve O and to the main shaft C. Such different speeds can be made to impart different speeds to the motion of the stirrer-shafts K about their own axes and about the main shaft C, which may be of advantage to the operator.

The driving-shafts F R may be actuated independently of one another, or said shafts F R may be connected by gears T U. By having the gears T U of different sizes or diameters the shafts F R, when geared together, can be made to assume different speeds. By having the gears T U, or one of said gears, feathered on their shafts F R said gears can be readily moved out of or into gear with one another.

The driving-shafts F R can be suitably borne or supported—as, for example, by hangers or arms V, connected to a suitable support, W, such as the roof of a building or the ceiling of a room. A brace or bearing, X, can be used to steady the main shaft C.

If desired, only one stirrer-shaft K need be employed; but two are preferable.

It will be understood that we do not broadly claim a horizontal stirrer-shaft supported by a hanger suspended from an arm carried by a vertical main shaft, nor do we claim the combination, with such main shaft and stirrer-shaft, of driving-shafts provided with separate pulleys and with adjustable gears, whereby the main shaft and stirrer-shaft can be rotated either together or independently at the same or different speeds, such being shown in the application of John P. Doelfel, one of the present applicants, filed January 27, 1887, Serial No. 225,694.

What we claim as new, and desire to secure by Letters Patent, is—

1. The combination, with the main shaft C and stirrer-shafts K K, of the gears H I I, connecting said shafts, a frame, N, mounted loosely on the main shaft and provided with hangers M to support the stirrer-shafts, a sleeve, O, loosely surrounding the main shaft and secured to said frame N, and means for rotating said sleeve and main shaft in opposite directions, substantially as shown and described.

2. The combination, with the main shaft C and a stirrer-shaft, K, of a driving-gear, H, connecting-gear I, primary stirrers J, and a secondary stirrer, L, situated between the gear I and the main shaft, substantially as set forth.

3. The combination of the main shaft C, stirrer-shafts K K, gears H I, frame or arms N, mounted loosely on the main shaft and provided with hangers M, the sleeve O, secured to said frame, the gear P on said loose sleeve, the gear D on the main shaft, and means for actuating said gears on the sleeve and main shaft, either together or independently, at varying speeds, substantially as described.

In testimony whereof we have hereunto set our hands and seals in the presence of two subscribing witnesses.

J. P. DOELFEL. [L. S.]
J. C. G. HÜPFEL. [L. S.]

Witnesses:
W. HAUFF,
E. F. KASTENHUBER.